United States Patent [19]

Gottschlich et al.

[11] 3,978,040

[45] Aug. 31, 1976

[54] PROCESS FOR THE PREPARATION OF CYANOAZO COMPOUNDS BY REACTING HALOGENOAZO COMPOUNDS WITH CuCN IN AN AQUEOUS MEDIA IN THE PRESENCE OF A NITROGEN BASE

[75] Inventors: Alois Gottschlich; Klaus Leverenz, both of Leverkusen; Karl-Ludwig Moritz, Cologne, all of Germany

[73] Assignee: Bayer Aktiengesellschaft, Leverkusen, Germany

[22] Filed: Mar. 1, 1974

[21] Appl. No.: 447,219

[30] Foreign Application Priority Data

Mar. 3, 1973  Germany............................ 2310745

[52] U.S. Cl................................. 260/205; 260/155; 260/156; 260/157; 260/158; 260/174; 260/196; 260/207; 260/207.1; 260/208

[51] Int. Cl.² .................... C09B 43/00; D06P 3/52; D06P 3/54

[58] Field of Search ............ 260/208, 205, 206, 207, 260/207.1, 207.5, 155, 156, 157, 158, 196, 174

[56] References Cited

UNITED STATES PATENTS

| 1,725,596 | 8/1929 | Pongrantz | 260/465 R |
|---|---|---|---|
| 2,128,684 | 8/1938 | Vollmann et al. | 260/465 R X |
| 2,195,076 | 3/1940 | Braun et al. | 260/465 R |
| 3,259,646 | 7/1966 | Harris et al. | 260/465 P |
| 3,342,804 | 9/1967 | Mueller | 260/207.1 |
| 3,393,191 | 7/1968 | Mueller | 260/205 |
| 3,407,189 | 10/1968 | Merian | 260/207.1 |
| 3,574,183 | 4/1971 | Kruckbnberg | 260/207.1 |
| 3,772,267 | 11/1973 | Cornelius et al. | 260/207.1 |
| 3,821,195 | 6/1974 | Putzig | 260/206 |
| 3,876,621 | 4/1975 | Hagen et al. | 260/157 |

FOREIGN PATENTS OR APPLICATIONS

779,291  2/1968  Canada............................ 260/207.1

OTHER PUBLICATIONS

Bacon et al., J. Chem. Soc. (London), Vol. of 1964, pp. 1097–1107.

*Primary Examiner*—Floyd D. Higel
*Attorney, Agent, or Firm*—Plumley & Tyner

[57] ABSTRACT

Preparation of azo dyestuffs which possess at least one nitrile group in the ortho-position to the azo bridge, by reacting the corresponding ortho-halogenoazo compounds with CuCN or systems which for CuCN, in the presence of nitrogen bases and optionally of surface-active agents, in an aqueous medium, with replacement of at least one halogen substituent, which is in the orthoposition to the azo bridge, by a nitrile group. Preferably the reaction is carried out as one-pot-process. The dyestuffs prepared by the process, a substantial number of which are known, are useful in dyeing natural and synthetic fiber materials.

12 Claims, No Drawings

PROCESS FOR THE PREPARATION OF CYANOAZO COMPOUNDS BY REACTING HALOGENOAZO COMPOUNDS WITH CuCN IN AN AQUEOUS MEDIA IN THE PRESENCE OF A NITROGEN BASE

It has been found that azo compounds which possess at least one nitrile group in the ortho-position to the azo bridge can be prepared simply and in good yields if corresponding ortho-halogenoazo compounds are reacted with CuCN or systems which form CuCN, in the presence of nitrogen bases and optionally of surface-active agents, in an aqueous medium, with replacement of at least one halogen substituent, which is in the ortho-position to the azo bridge, by a nitrile group.

The halogenoazo compounds used as starting materials preferably correspond to the formula

(I)

wherein
D denotes the radical of a diazo component which possesses at least one halogen atom in the ortho-position to the azo bridge and
K denotes the radical of an aromatic coupling component which is free of phenolic or enolic hydroxyl groups which are in the ortho-position to the azo bridge.

Suitable radicals D are aromatic-carboxylic radicals, especially those of the benzene, diphenyl and napthalene series, and also aromatic-heterocyclic radicals, preferably those of the benzthiazole, pyridine, thiophene, quinoline and quinoxaline series which can contain further substituents customary in dyestuff chemistry.

As examples there may be mentioned: halogen atoms, such as chlorine, bromine, iodine and fluorine, and alkyl, alkoxy, aryl, aryloxy, nitro, nitrile, trifluoromethyl, alkylcarbonyl, alkoxycarbonyl, arylcarbonyl, alkylsulphonyl, arylsulphonyl, alkylcarbonylamino, arylcarbonylamino, arylazo, sulphonic acid, carboxylic acid, sulphamoyl and carbamoyl radicals.

Suitable radicals K are radicals of coupling components of the benzene, naphthalene, pyrazole, imidazole, indole, pyridine and quinoline series. These radicals can again carry further substituents.

A category of preferred starting products are those of the formula I in which D represents the radical

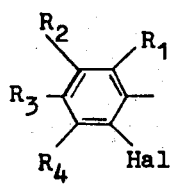

wherein
Hal denotes Cl, Br or I,
$R_1$ denotes alkyl, alkoxy, F, I, Cl, Br, $CF_3$, CN, nitro, sulpho, alkylsulphonyl, arylsulphonyl, dialkylaminosulphonyl, aryloxysulphonyl, carboxyl, alkylcarbonyl, alkoxycarbonyl, dialkylaminocarbonyl or arylcarbonyl, $R_2$–$R_4$ denote hydrogen, $R_1$, alkylcarbonylamino, arylcarbonylamino, arylsulphonylamino, an ammonium group or an arylazo group
and wherein
any two adjacent radicals $R_1$–$R_4$ can conjointly form the remaining members of a fused carbocyclic or heterocyclic ring system, and
K has the abovementioned meaning, but preferably represents the radical

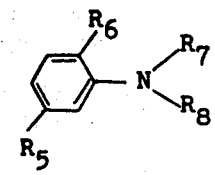

wherein
$R_5$ denotes hydrogen, alkoxy, aryloxy, alkylcarbonylamino, aralkylcarbonylamino, cycloalkylcarbonylamino, arylcarbonylamino, heterylcarbonylamino, alkoxycarbonylamino, alkylsulphonylamino, arylsulphonylamino, aminocarbonylamino, CN, $CF_3$, carbamoyl, dialkylaminocarbonyl, alkoxycarbonyl, sulphamoyl, dialkylaminosulphonyl or alkylsulphonyl,
$R_6$ denotes hydrogen, alkyl, alkoxy, aryloxy, aralkoxy, halogen, CN, carboxyl or alkoxycarbonyl,
$R_7$ denotes hydrogen, alkyl, aralkyl or aryl and
$R_8$ denotes hydrogen, alkyl or aralkyl.

A category of very particularly preferred starting products corresponds to the formula I wherein D represents the radical

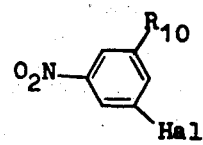

wherein
$R_{10}$ denotes nitro, nitrile, alkylsulphonyl, arylsulphonyl, halogen, alkylcarbonyl, arylcarbonyl, $CF_3$, dialkylaminosulphonyl, dialkylaminocarbonyl or alkoxycarbonyl, and
K represents the radical

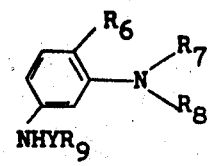

wherein
$R_6$, $R_7$ and $R_8$ have the abovementioned meaning,
Y denotes CO or $SO_2$ and
$R_9$ denotes alkyl, aralkyl, aryl, heteryl, alkoxy, aralkoxy, aryloxy, amino, alkylamino, dialkylamino, cycloalkylamino or arylamino.

By the alkyl and alkoxy radicals mentioned above in any desired context (thus, for example, also including alkylsulphonyl or alkoxycarbonyl), there are preferably to be understood radicals with 1–5 C atoms which can preferably be monosubstituted by halogen, OH, CN, $C_1$–$C_4$-alkoxy, $C_2$–$C_5$-alkylcarbonyloxy and others, whilst by aryl or aryloxy radicals mentioned in any desired context there are preferably to be understood phenyl or phenoxy radicals which can be substituted by Cl, F, Br, $C_1$–$C_4$-alkoxy, $NO_2$, CN, $C_1$–$C_4$-alkyl, phenoxy and others.

Examples of suitable heteryl radicals are furane, thiophene, pyridine, pyrimidine, benzoxazole, benzthiazole and benzimidazole radicals, which can optionally contain further non-ionic substituents, such as $C_1$–$C_3$-alkyl, $C_1$–$C_3$-alkoxy, halogen, nitrile, $C_2$–$C_5$-carbalkoxy and phenyl.

By ammonium groups in the widest sense there are to be understood groups of the formula

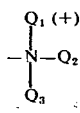

wherein $Q_1$, $Q_2$ and $Q_3$ denote alkyl, cycloalkyl, aralkyl or aryl or form the remaining members of a N-heterocyclic structure, such as pyridine, imidazole and triazole.

Suitable cycloalkyl radicals are, in particular, cyclohexyl radicals, which can be substituted by halogen, alkyl and alkoxy.

Within the scope of the present invention, halogen is to be understood as fluorine, bromine, chlorine or iodine, provided no other definition is given.

Suitable aralkyl or aralkoxy radicals are phenyl-$C_1$–$C_3$-alkyl and phenyl-$C_1$–$C_3$-alkoxy radicals, which can be substituted by halogen, $C_1$–$C_4$-alkyl or $C_1$–$C_4$-alkoxy in the phenyl radical.

In carrying out the process according to the invention, the reaction conditions and reactants can be varied extensively.

For example, the reaction temperatures are between room temperature and the boiling point of the reaction medium, and preferably between 80° and 100°C.

The particular advantage of the process according to the invention is that it is preferably carried out under normal pressure.

Of the CuCN used as a reactant, 1 mol is preferably employed per halogen atom to be replaced in the ortho-halogenoazo dyestuffs used as the starting material.

Systems forming CuCN which can be used are:

a. $Cu^{++}/2CN^{(-)}$ systems, for example mixtures of Cu-II salts/alkali metal cyanides b. $Cu^+/CN^{(-)}$ systems, for example mixtures of Cu-I salts/alkali metal cyanides or mixtures of Cu-II salts/alkali metal cyanides/reducing agents.

Example of suitable mixtures a) are mixtures of $CuCl_2$, $Cu(NO_3)_2$ or $CuSO_4$ and NaCN or KCN.

Suitable mixtures b) are: CuCl or CuBr with NaCN or KCN, as well as the abovementioned Cu-II salts with NaCN or KCN plus $NaHSO_3$, $H_2SO_3$, $Na_2SO_3$ and others.

In many cases — particularly where sparingly water-soluble azo dyestuffs are being reacted — it can be of advantage to add surface-active agents to the reaction mixture. As such, it is possible to use, for example, the tensides listed in Ullmann, Encyklopadie der technischen Chemie (Encyclopaedia of Industrial Chemistry), Edition II, Volume 16, page 724–756 (1965). Anionic and non-ionic tensides or mixtures thereof have proved particularly suitable, such as, for example, condensation products of naphthalene, formaldehyde and sulphuric acid, lignin sulphonates, condensation products of 2-naphthol-6-sulphonic acid, cresol and formaldehyde, polyethers from oleyl alcohol and ethylene oxide, polyethers from lauryl alcohol and ethylene oxide, polyesters from castor oil and ethylene oxide and polyesters from abietic acid and ethylene oxide.

In addition, non-basic, preferably water-miscible, organic solvents can be added as solubilising agents to the aqueous reaction mixture. In general, the proportion of organic solvent in the otherwise aqueous medium is then 1 to 50 per cent by weight, preferably 5 to 10 per cent by weight.

Suitable organic solvents are: alcohols, such as, for example, ethanol, isopropanol or ethylene glycol; ethers, such as ethylene glycol monomethyl ether or monoethyl ether, dioxane or tetrahydrofurane; ketones, such as acetone, methyl ethyl ketone or cyclohexanone; acid amides such as foramide, dimethylformamide, dimethylacetamide, dimethylacetamide, ε-caprolactam, N-methylpyrrolidone, hexamethylphosphoric acid trisamide or tetramethylurea; carboxylic acid nitriles such as acetonitrile, β-hydroxy-propionitrile, acrylonitrile; sulphoxides such as dimethylsulphoxide and sulphones such as tetramethylenesulphone; nitro compounds such as nitromethane.

Examples of suitable nitrogen bases to be used according to the invention are: ammonia; aliphatic and araliphatic amines such as methylamine, ethylamine, diemethylamine, diethylamine, triethylamine, 2-aminoethanol, diethanolamine, tris(hydroxypropyl)-amine, 3-dimethylamino-propionitrile and aralkylamines such as benzylamine and dimethylbenzylamine; aromatic carbocyclic amines such as N,N-dimethylamino-benzene, N,N-diethylamino-benzene, N,N-bis-(β-hydroxyethyl)-aminobenzene and N,N-bis(β-γ-dihydroxypropyl)-amino-benzene; N-heterocyclic compounds, such as N-methylpyrrolidine, piperidine, morpholine, N-methylmorpholine, triethylenediamine, N,N-dimethylpiperazine, 4,5-dimethyl-thiazole and especially pyridines such as pyridine, 2-, 3- or 4-methyl-pyridine, 2-methyl-5-ethyl-pyridine, 2-amino-pyridine, 4-aminomethyl-pyridine and 2-, 3- or 4-cyano-pyridine; quinolines such as quinoline, 2-, 3- or 4-methyl-quinoline, 8-amino-quinoline and 8-hydroxy-quinoline; indolines such as 2,3,3-trimethyl-indolenine; imidazoles such as imidazole, 1-methyl-imidazole, 1,2-diemthyl-imidazole and 2-methyl-imidazole; also isoquinoline, benzthiazole, 2-methyl-benzthiazole, 2-methyl-benzoxazole, benzimidazole, 1-methyl-benzimidazole, pyrazole and 5-methyl-isoxazole.

Preferred nitrogen bases are pyridines, quinolines, isoquinolines, imidazoles and indolenines. Pyridine is preferred very particularly.

The ratios of these nitrogen bases can be varied over a substantial range. In general, 0.05 mol to 5 mols of nitrogen base is used per mol of metal cyanide, a molar ratio of 1:1 being preferred.

Suitable diazo components $D-NH_2$ are: 1-methyl-2-amino-3-bromobenzene, 2-amino-3-bromo-trifluoromethyl-benzene, 1-amino-2nitro-6-bromobenzene, 2,6-dichloro-1-aminobenzene, 2,6-dibromo-1-aminobenzene, 2-chloro-6-bromo-1-aminobenzene, 1,3-dimethyl-4-amino-5-bromobenzene, 1-methyl-2-amino-3,5-dibromobenzene, 1-methyl-2-amino-3-bromo-5-nitrobenzene, 2-amino-3-bromo-5-nitro-trifluoromethyl-benzene, 1-amino-2,4,6-trichlorobenzene, 1-amino-2,4-dichloro-6-bromobenzene, 1-amino-2,4,6-tribromobenzene, 1-methyl-3,5-dibromo-4-aminobenzene, 1-methyl-3-chloro-5-bromo-4-aminobenzene, 1-methyl-3,5-dichloro-4-aminobenzene, 1amino-2,6-dichloro-4-nitrobenzene, 1-amino-2-chloro-6-bromo-4-nitrobenzene, 1-amino-2,6-dibromo-4-nitro-benzene, 1-amino-2,6-diiodo-4-nitrobenzene, 1-amino-2,4-dinitro-6-chlorobenzene, 1-amino-2,4-dinitro-6-bromobenzene, 1-amino-2-cyano-4-nitro-6-bromobenzene, 1-amino-2-methyl-sulphonyl-4-nitro-6-bromobenzene, 1-amino-2-ethyl-sulphonyl-4-nitro-6-bromobenzene, 1-amino-2-phenylsulphonyl-4-nitro-6-bromobenzene, 1-amino-2,6-dichloro-4-methylsulphonyl-benzene, 1-amino-2-chloro-6-bromo-4-methylsulphonyl-benzene, 1-amino-2,6-dibromo-4-methylsulphonyl-benzene, 1-amino-2,6-dibromo-4-methylsulphonylbenzene, 2-amino-3-bromo-5-nitro benzoic acid methyl ester or ethyl ester, 2-amino-3-bromo-5-nitro-benzenesulphonic acid phenyl ester, 2-amino-3-bromo-5-nitro-acetophenone, 2-amino-3-bromo-5-nitro-benzophenone, 1-amino-2-methoxy-4-nitro-6-chlorobenzene, 1-amino-2-ethoxy-4-nitro-6-bromobenzene, 1-amino-2,4-dicyano-6-bromobenzene, 1-amino-2,4-dicyano-3,5-dimethyl-6-bromobenzene, 3,5-dibromo-4-amino-trifluoromethylbenzene, 3,5-dibromo-4-amino-benzoic acid methyl ester, 3,5-dibromo-4-amino-benzoic acid, 3-methyl-4-amino-5-bromobenzenesulphonic acid, 2-bromo-3-amino-4-methyl-benzenesulphonic acid, 3-methoxy-4-amino-5-bromobenzenesulphonic acid, 2-bromo-3-amino-4-ethoxy-benzenesulphonic acid, 3-chloro-4-amino-5-bromobenzenesulphonic acid, 2-bromo-3amino-4-chlorobenzenesulphonic acid, N,N,N-trimethyl-N-(3,5-dibromo-4-amino-phenyl)-ammonium chloride, N,N,N-trimethyl-N-(3-chloro-5-bromo-4-amino-phenyl)-ammonium chloride, N,N,N-trimethyl-N-(2,4-dibromo-3-aminophenyl)-ammonium chloride, 1-amino-2-bromo-naphthalene, 1-amino-2,4-dibromo-naphthlain, 1-amino-2-bromo-4-nitro-naphthalene, 4-amino-3-bromo-naphthalene-1-sulphonic acid, 5-amino-6-bromo-naphthalene-1-sulphonic acid, 5-amino-6-bromo-8-nitro-naphthalene-1-sulphonic acid, 5-amino-6-bromo-8-nitronaphthalene-2-sulphonic acid, 5,7-dibromo-8-amino-naphthalene-2-sulphonic acid, 5-acetamino-7-bromo-8-amino-naphthalene-2-sulphonic acid, 8-phenylamino-naphthalene-1-sulphonic acid, 2-methyl-4-amino-5-bromo-7-nitro-benzthiazole-(1,3), 4-amino-5-bromo-7-nitro-benzthiazole-(1,2). 2-(2'-amino-3'-bromo-5'-nitro-phenyl)-benzthiazole-(1,3), 2-(2'-amino-3'-bromo-5'-nitrophenyl)-thiazole-(1,3), 2-(2'-amino-3'-bromo-5'-nitrophenyl)-4-methyl-thiazole-(1,3), 2-methyl-5-(2'-amino-3'-bromo-5'-nitrophenyl)-oxidazole-(1,3,4), 2-methyl-5-(2'-amino-3'-bromo-5'-nitrophenyl)-thiadiazole-(1,3,4), 2-amino-3-bromo-5-nitro-pyridine N-oxide, 4-amino-5-bromo-7-nitro-benzthiadiazole-(2,1,3), 5-amino-6-bromo-8-nitro-quinoline, 5-amino-6-bromo-8-nitro-quinoxazoline, 5-amino-6-bromo-8-nitro-quinazoline, 1-(2'-amino-3'-bromo-5'-nitrophenyl)-pyrazole, 2-amino-3-bromo-5-nitro-thiophene, 2-amino-3-bromo-5-methylsulphonyl-thiophene, 2-amino-3-bromo-5-methylcarbonyl-thiophene, 3,5-dibromo-4-amino-azobenzene, 3-bromo-5-chloro-4-amino-azobenzene, 3,5-dibromo-4-amino-4'-nitro-azobenzene, 3-bromo-5,2'-dimethyl-4-amino-azobenzene, 3-bromo-5,4'-dinitro-4-amino-azobenzene, 3-bromo-4-amino-5-methoxy-azobenzene, 3-bromo-4-amino-5-methoxy-4'-nitro-azobenzene, 3-bromo-4-amino-5-methoxy-azobenzene-3'-sulphonic acid and 3-bromo-4-amino-5-methyl-azobenzene-4-sulphonic acid.

Suitable coupling components KH are: 1-hydroxybenzene, 1-hydroxy-3-acetamino-benzene, 1-hydroxy-3-methylsulphonylamino-benzene, 3-hydroxyphenylurea, 1-methyl-2-hydroxy-benzene, 1-methyl-2-hydroxy-4-acetamino-benzene, 1-hydroxy-naphthalene, 5-hydroxy-naphthalene-(2)-sulphonic acid, 8-hydroxy-naphthalene-1-sulphonic acid, 1-hydroxy-naphthalene-2-sulphonic acid, 1-(N,N-diethylamino)-benzene, 1-[N-ethyl-N-(β-cyanoethylamino)]-benzene, 1-[N-ethyl-N-(β-hydroxyethyl)-amino]-benzene, 1-[N-butyl-N-(β-acetoxyethyl)-amino]-benzene, 1-[N,N-bis-(β-hydroxyethyl)-amino]-benzene, 1-[N-(β-cyanoethyl)-amino]-benzene, 1-[N-β-hydroxyethyl)-N-(β-cyanoethyl)-amino]-benzene, 1-[N-(β-acetoxyethyl)-N-(β-cyanoethyl)-amino]-benzene, 1-[N-(β-γ-dihydroxypropyl)-N-(β-cyanoethyl)-amino]-benzene, 1-[N,N-bis-(β-acetoxyethyl)-amino]-benzene, 1-(N,N-bis-(β-methoxycarbonyloxyethyl)-amino]-benzene, 1-[N-(β-cyanoethyl)-N-(β-methoxycarbonylethyl)-amino]-benzene, 1-[N-ethyl-N-(β-ethoxyethyl)-amino]benzene, 1-(N-p-hydroxybenzylamino)-benzene, 1-(N-ethyl-N-benzylamino)-benzene, 1-[N-benzyl-N-(β-cyanoethyl)-amino]-benzene, 1-[N-(p-hydroxy-benzyl)-N-(β-hydroxyethyl)-amino]-benzene, [2-(N-ethyl-N-phenylamino)-ethyl]-trimethylammonium chloride, [2-(N-ethyl-N-phenylamino)-ethyl]-benzyl-dimethylammonium chloride, 1-[N-ethyl-N-(3'-sulphobenzyl)-amino]-benzene and especially 1-amino-3-acetamino-benzene, 1-amino-3methylsulphonyl-amino-benzene, 1-methyl-2-amino-4-benzoylamino-benzene, 1-methyl-2-amino-4-phenylsulphonylamino-benzene, 1-methoxy-2-amino-4-ethylcarbonylamino-benzene, 1-ethoxy-2-amino-4-(aminocarbonylamino)-benzene, 1-(N,N-dimethylamino)-3-acetamino-benzene, 1-(N,N-diethylamino)-3-acetamino-benzene, 1-(N,N-di-n-propylamino)-3-acetamino-benzene, 1-(N,N-di-n-butylamino)-3-acetamino-benzene, 1-(N-ethyl-N-n-propylamino)-3-acetamino-benzene, 1-(N-ethyl-N-n-butylamino)-3-acetamino-benzene, 1-(N,N-diethylamino)-3-methylsulphonylamino-benzene, 1-(N,N-diethylamino)-3-ethyl-carbonylamino-benzene, 1(N,N-diethylamino)-3benzoylamino-benzene, 1-diethylamino-2-methoxy-5-acetamino-benzene, 1-[N,N-bis-(β-hydroxyethyl)-amino]-3-acetamino-benzene, 1-[N,N-bis-(β-hydroxyethyl)-amino]-2-ethoxy-5-acetoamino-benzene, 1-(N-ethyl-N-benzylamino)-3-acetamino-benzene, 1-[N-(β-hydroxyethyl)-N-benzylamino]-3-methylsulphonylamino-benzene, 1-(p-hydroxy-benzylamino)-3-(aminocarbonylamino)-benzene, 1-(N-(β-cyanoethyl)-N-ethylamino)-3-acetamino-benzene, 1-(p-hydroxy-benzylamino)-3-(β-hydroxyethylcarbonylamino)-benzene, 1-[N,N-bis-(β-chloroethylamino)-3-acetamino-benzene, 1-[N-(β-hydroxyethyl)-amino]-2-methyl-5-chloroacetaminobenzene, 1-(N,N-diethylamino)-3-acetoxyacetaminobenzene, 1-[N,N-bis-(β-acetoxyethyl)-amino]-2-ethoxy-5-acetamino-benzene, 1-[N,N-bis-(β-methoxycarbonyloxyethyl)-amino]-2-methoxy-5-acetaminobenzene, 1-[N-(β-cyanoethyl)-N-(β-hydroxyethyl)-amino]-2-methoxy-5-acetamino-benzene, 1-[N-(β-hydroxy-γ-phenoxypropyl)-amino]-2-ethoxy-5-acetamino-benzene, 1-[N-(β-ethoxycarbonyl-ethyl)-amino]-2-methoxy-5-acetamino-benzene, N-phenylaminobenzene, (N-methyl-N-phenylamino)-benzene, (N-ethyl-N-phenylamino)-benzene, [N-ethyl- N-(p-ethoxy-phenyl)-amino]-benzene, 1-(N-phenylamino)-3-acetamino-benzene, 1-(N-methyl-N-phenylamino)-3-acetamino-benzene, 1-(N-(p-methyl-phenyl)-amino)-3-acetamino-benzene, 1-(N-ethyl-N-allyl-amino)-3-benzoylaminobenzene, [2-(N-ethyl-N-(3'-acetamino-phenyl)-amino)-ethyl]-trimethylammonium chloride, [3-N-ethyl-N-(3'-acetamino-phenyl)-amino)-2-hydroxypropyl]-pyridinium chloride, 1-[N-diethylamino]-3-methoxycarbonylamino-benzene, 1-(N-ethyl-N-benzylamino)-3-ethoxycarbonylamino-benzene, 1-[N-ethyl-N-(β-methoxycarbonyl-ethyl)-amino]-3-acetaminobenzene, 1-(N,N-dimethylamino)-2-phenoxy-5-acetaminobenzene, 1-ethyl-7-acetamino-1,2,3,4-tetrahydro-quinoline and 1-(β-cyanoethyl)-7-methylsulphonylamino-1,2,3,4-tetrahydroquinoline.

The nitrile replacement according to the invention is preferably carried out in a 5-fold to 10-fold amount by weight of water (relative to the o-halogenoazo dyestuff employed).

A particular advantage of the process according to the invention is that the reaction can be carried out as a one-pot process. For this, the procedure followed is to diazotise aromatic amines of the formula $DNH_2$ in an acid aqueous medium, couple the product to coupling components of the formula KH, add the appropriate amount of a nitrogen base and of a metal cyanide to the resulting aqueous dyestuff dispersion after it has been neutralised (for example with alkali metal hydroxide), then heat the mixture to the desired reaction temperature (preferably by blowing steam into it), stir the reaction mixture further, with additional provision of heat, until orthohalogenoazo dyestuff is no longer detectable by thin layer chromatography, convert the resulting insoluble copper-I halide into a water-soluble copper compound by addition of the calculated quantity of $FeCl_3$ or alkali metal cyanide and then filter off the ortho-cyanoazo dyestuff and wash the filter cake thoroughly with water.

Of course it is also possible to prepare the orthohalogenoazo compounds of the formula I, which serve as starting materials, by other methods customary for the preparation of azo dyestuffs, for example by condensation of appropriate amino compounds with nitroso compounds.

A substantial number of the products of the process of the invention are known and are valuable dyestuffs which are preferentially suitable for dyeing natural and synthetic fibres and plastic masses.

The dyestuffs of the formula

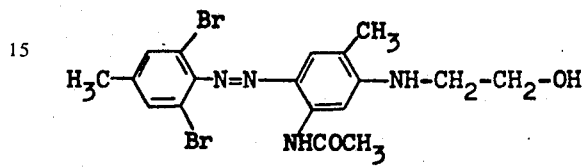

are preferentially suitable for dyeing fibres, fabrics and films of polyesters, such as, for example, cellulose 2½-acetate, cellulose triacetate, polyethylene terephthalate or poly-1,4-cyclohexanedimethylene terephthalate, these being dyed in clear violet and blue shades which are fast to sublimation and to light.

EXAMPLE 1:

650 g of a moist filter cake which contains 281 g of the dyestuff of the formula

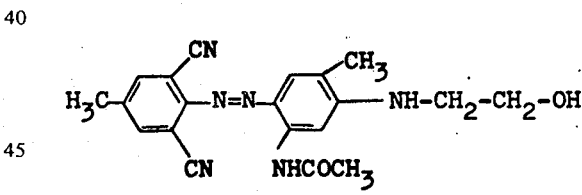

with the addition of 125 g of copper-(I) cyanide, 28 g of a condensation product of naphthalene, formaldehyde and sulphuric acid and 4 g of an oleyl alcohol polyglycol ether, are stirred in 1.5 l of water for several hours. After addition of 268 ml of pyridine the batch is heated to the boil over the course of approx. 1 hour and is stirred under reflux for a further 3 hours at this temperature. The completeness of the reaction is checked by thin layer chromatography. The pyridine is then distilled off in steam. After cooling the reaction mixture to room temperature, 500 g of ice, 300 ml of 30% strength hydrochloric acid and 250 g of iron-(III) chloride are added successively. After stirring overnight at room temperature, the dyestuff is filtered off, washed first with 5% strength hydrochloric acid and finally with water until neutral, and dried. The dyestuff of the formula is obtained as a red powder in 97% yield. It dyes Perlon fibres and fabrics in clear red shades which are fast to light and to wet processing.

A similarly good result is obtained if, in the above example, the pyridine is replaced by 50 g of imidazole, 60 g of 1-methyl-imidazole or 70 g of 1,2-dimethyl-imidazole or the starting materials listed in the table which follows are employed:

Table I

| Ex. No. | ortho-halogenoazo dyestuff | Nitrogen base | Reaction product | Colour in dimethyl-formamide |
|---|---|---|---|---|
| 2 | 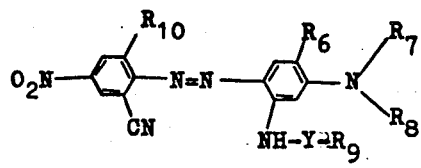 | Quinoline | | red |

Table I-continued

| No. | Starting dyestuff | Nitrogen base | Final dyestuff | Colour of the solution in DMF |
|---|---|---|---|---|
| 3 | $O_2N$-(Br,Br)-N=N-Ar-$N(C_2H_5)_2$, NHCOCH$_3$ | Isoquinoline | $O_2N$-(CN,CN)-N=N-Ar-$N(C_2H_5)_2$, NHCOCH$_3$ | blue |
| 4 | $O_2N$-(Br,Br)-N=N-Ar-$N(C_3H_7)_2$, NHSO$_2$CH$_3$ | Triethylamine | $O_2N$-(CN,CN)-N=N-Ar-$N(C_3H_7)_2$, NHSO$_2$CH$_3$ | blue |
| 5 | CH$_3$OOC-(Br,Br)-N=N-Ar-$N(C_2H_5)_2$, NH-COOC$_2$H$_5$ | 5-Methyl-isoxazole | CH$_3$O-CO-(CN,CN)-N=N-Ar-$N(C_2H_5)_2$, NHCOOC$_2$H$_5$ | violet |
| 6 | CH$_3$SO$_2$-(Br,Br)-N=N-Ar-$N(C_4H_9)_2$, NHCOC$_2$H$_5$ | 2,3,3-Tri-methyl-indolenine | CH$_3$-SO$_2$-(CN,CN)-N=N-Ar-$N(C_4H_9)_2$, NHCOC$_2$H$_5$ | violet |
| 7 | Cl-(Br,Br)-N=N-Ar-N(CH$_2$-CH$_2$-OH)(CH$_2$-CH$_2$-CN), NHCONH$_2$ | Benzimidazole | Cl-(CN,CN)-N=N-Ar-N(CH$_2$CH$_2$-OH)(CH$_2$-CH$_2$-CN), NHCONH$_2$ | red |
| 8 | F$_3$C-(Br,Br)-N=N-Ar-$N(C_2H_5)_2$, NHCOOCH$_3$ | 2-Methyl-benzoxazole | F$_3$C-(CN,CN)-N=N-Ar-$N(C_2H_5)_2$, NHCOOCH$_3$ | red |
| 9 | CH$_3$CONH-(Br,Br)-N=N-Ar-N(CH$_2$CH$_2$OH)(C$_2$H$_5$), NHCOCH$_3$ | 2-Methyl-benzthiazole | CH$_3$-CONH-(CN,CN)-N=N-Ar-N(CH$_2$CH$_2$OH)(C$_2$H$_5$), NHCOCH$_3$ | red |
| 10 | $O_2N$-(I,I)-N=N-Ar-N(C$_2$H$_5$)(CH$_2$-Ph) | 3-Methyl-pyridine | $O_2N$-(CN,CN)-N=N-Ar-N(C$_2$H$_5$)(CH$_2$-Ph) | violet |
| 11 | Ph-N=N-(Br,Br)-N=N-Ar-N(C$_2$H$_5$)(CH$_2$-Ph), NHCOCH$_3$ | 2,3,3-Tri-methyl-indolenine | Ph-N=N-(CN,CN)-N=N-Ar-N(C$_2$H$_5$)(CH$_2$-Ph), NHCOCH$_3$ | blue |

Table I-continued

| No. | Starting dyestuff | Nitrogen base | Final dyestuff | Colour of the solution in DMF |
|---|---|---|---|---|
| 12 | 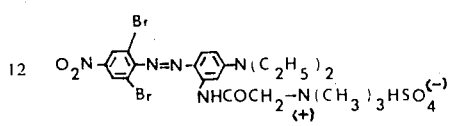 | Pyridine | 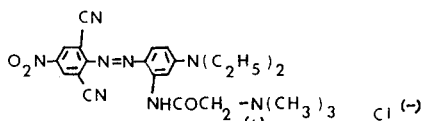 | blue |
| 13 | 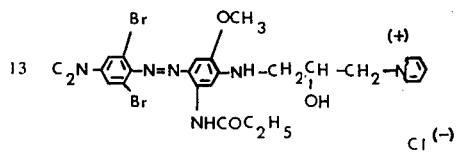 | 4-Methyl-quinoline | 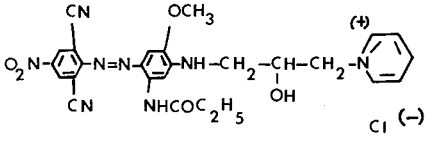 | blue |
| 14 | 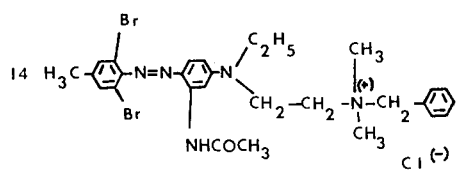 | Isoquino-line | 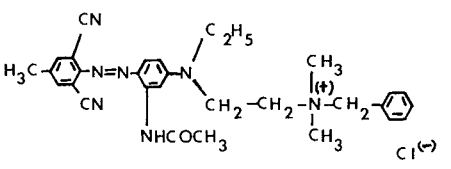 | red |
| 15 | 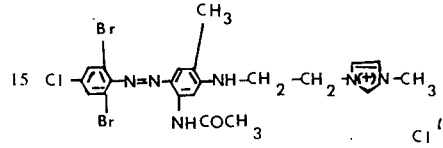 | 1-Methyl-imidazole | 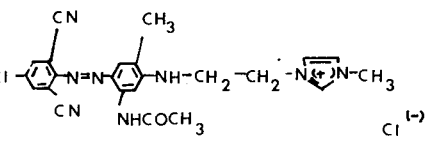 | red |
| 16 | 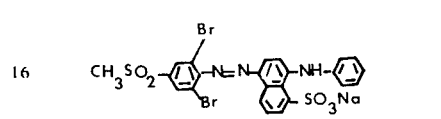 | Imidazole | 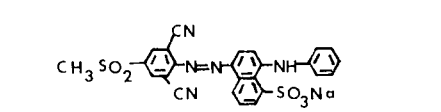 | blue |
| 17 | 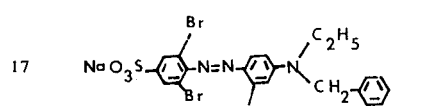 | Imidazole | 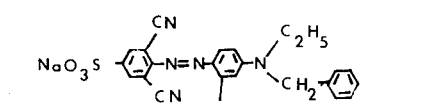 | violet |

EXAMPLE 18:

185 g of a moist filter cake which contains 48 g of the dyestuff of the formula

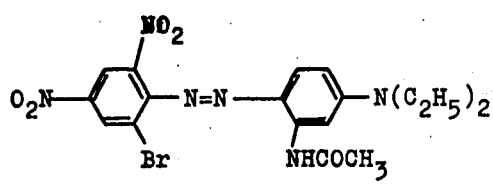

7.5 g of imidazole, 5 g of a lignin sulphonate and 0.5 g of an oleyl alcohol polyglycol ether are stirred in 250 ml of water for 3 hours at room temperature and the mixture is then heated to the boil over the course of approx. 1 hour and kept at this temperature for 2 hours. The course of the reaction is followed by thin layer chromatography. After cooling to room temperature, 100 g of ice, 50 ml of 30% strength hydrochloric acid and 40 g of iron-(III) chloride are added. After stirring overnight at room temperature, the dyestuff is filtered off, washed first with dilute hydrochloric acid and then with water, and dried. A dark powder results, which dyes polyethylene terephthalate fibres in clear blue shades which are fast to light and to sublimation.

The dyestuff is identical with the compound obtained by diazotisation of 2,4-dinitro-6-cyano-1-aminobenzene and coupling to 1-(N,N-diethylamino)-3-acetaminobenzene.

Table 2 contains further examples.

| No. | Starting dyestuff | Nitrogen base | Final dyestuff | Colour of the solution in DMF |
|---|---|---|---|---|
| 19 | (structure) | 4-Methylquinoline | (structure) | blue |
| 20 | (structure) | Pyridine | (structure) | blue |
| 21 | (structure) | 1-Methylbenzimidazole | (structure) | blue |
| 22 | (structure) | 1-Methylimidazole | (structure) | blue |
| 23 | (structure) | 2-Methylimidazole | (structure) | violet |
| 24 | (structure) | 4-Methylpyridine | (structure) | blue |
| 25 | (structure) | 4,5-Dimethylthiazole | (structure) | red |
| 26 | (structure) | 3-Cyanopyridine | (structure) | red |

-continued

| No. | Starting dyestuff | Nitrogen base | Final dyestuff | Colour of the solution in DMF |
|---|---|---|---|---|
| 27 | [structure: Br-naphthyl-N=N-phenyl with N(CH₂-CH₂-OH)₂ and NHCOCH₃, Br substituent] | Pyridine | [structure: same with CN replacing one Br] | violet |
| 28 | [structure: O₂N-, Br-, isothiazole-N=N-phenyl-N(C₂H₅)₂, NHCOCH₃] | Imidazole | [structure: same with CN replacing Br] | blue |
| 29 | [structure: Br-quinolinyl-N=N-phenyl-N(C₂H₅)(CH₂-CH₂-OH), NH-SO₂-CH₃] | 1,2-Dimethyl-imidazole | [structure: same with CN replacing Br] | red |
| 30 | [structure: O₂N-, Br-, methylthiazolyl-N=N-phenyl with piperidine-type N-C₂H₅, NHCOCH₃] | 2-Methyl-imidazole | [structure: same with CN replacing Br] | blue |
| 31 | [structure: O₂N-phenyl-N=N-phenyl(NO₂,Br)-N=N-phenyl-N(C₂H₅)₂, NHCOCH₃] | Pyridine | [structure: same with CN replacing Br] | blue-green |
| 32 | [structure: CH₃-phenyl-N=N-phenyl(CH₃,Br)-N=N-phenyl-N(C₂H₅)(CH₂-phenyl), NHCONH₂] | Pyridine | [structure: same with CN replacing Br] | violet |
| 33 | [structure: SO₃Na-phenyl-N=N-phenyl(OCH₃,Br)-N=N-phenyl(CH₃)-NH-CH₂-CH₂-OH, NHCOCH₃] | Pyridine | [structure: same with CN replacing Br] | violet |
| 34 | [structure: CH₃-, Cl-, Br-phenyl-N=N-naphthyl(SO₃Na)-NH-phenyl] | Imidazole | [structure: same with CN replacing Br] | blue |

| No. | Starting dyestuff | Nitrogen base | Final dyestuff | Colour of the solution in DMF |
|---|---|---|---|---|
| 35 | | 1-Methyl-imidazole | | red |
| 36 | | 1,2,3-Tri-methyl-indolenine | | blue |
| 37 | | Imidazole | | blue |
| 38 | | 1,2-Dimethyl-imidazole | | red |
| 39 | | Pyridine | | blue |

EXAMPLE 40

335 g of a moist filter cake which contains 54 g of the dyestuff of the formula

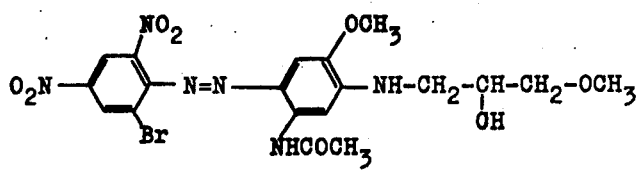

10 g of copper-(I) cyanide and 5 g of a condensation product of 2-naphthol-6-sulphonic acid, cresol and formaldehyde are stirred in 100 ml of ethylene glycol monomethyl ether and 100 ml of water. After adding 50 ml of pyridine the reaction mixture is warmed to 30°–40°C until at most a trace of the starting dyestuff remains detectable in the thin layer chromatogram. The precipitate is filtered off and introduced, whilst stirring, into a solution of 50 ml of 30% strength hydrochloric acid and 40 g of FeCl₃ in 200 ml of ice water. After stirring overnight, the resulting dyestuff of the formula

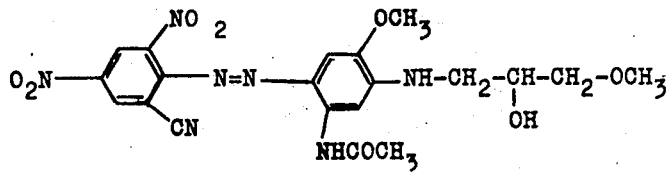

is filtered off and washed first with dilute hydrochloric acid and then with water until neutral. After drying, a dark powder is obtained, which dyes polyethylene terephthalate fibres in blue-green shades.

We claim:
1. In the cyano exchange process for preparing an azo compound having at least one cyano group ortho to the azo bridge by replacing an ortho halogen substituent with a cyano substituent; the improvement which comprises conducting the cyano exchange reaction at a temperature of 10°C to 110°C in an aqueous medium containing a nitrogen base and, CuCN or means for generating CuCN is situ; said nitrogen base being present in an amount of 0.05 to 5 moles per mole of CuCN; and said aqueous medium comprising water and up to 50 percent by weight of a non-basic, water-miscible organic solvent.
2. Process of claim 1 in which said aqueous medium comprises water and 5 to 10 percent by weight of a non-basic water-miscible organic solvent.
3. The process of claim 1 in which the amount of water is 5 to 10 times by weight of the ortho-halogen azo compound.
4. The process of claim 1 for preparing an azo compound of the formula

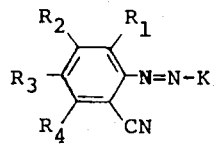

by reacting an azo compound of the formula

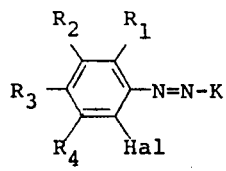

wherein
R₁ is alkyl, alkoxy, F, Cl, Br, I, CF₃, CN, nitro, sulpho, alkylsulphonyl, arylsulphonyl, dialkylamino-sulphonyl, aryloxysulphonyl, carboxyl, alkylcarbonyl, alkoxycarbonyl, arylcarbonyl, or dialkylamino-carbonyl, R₂–R₄ are hydrogen, R₁, alkylcarbonylamino-arylcarbonylamino, arylsulphonylamino, an ammonium group or arylazo;
or wherein
any two adjacent radicals R₁–R₄ conjointly form the remaining members of a fused carbocyclic or heterocyclic ring system;
Hal is Cl, I or Br; and
K is the radical of an aromatic coupling component which is free of phenolic or enolic hydroxyl groups ortho to the azo bridge.
5. Process of claim 4 in which K is

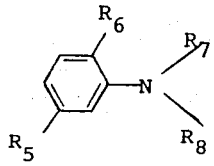

wherein
R₅ is hydrogen, alkoxy, aryloxy, alkylcabonylamino, aralkylcarbonylamino, cycloalkylcarbonylamino, arylcarbonylamino, heterylcarbonylamino, alkoxycarbonylamino, alkylsulphonylamino, arylsulphonylamino, aminocarbonylamino, CN, CF₃, carbamoyl, dialkylaminocarbonyl, alkoxycarbonyl, sulphamoyl, dialkylaminosulphonyl or alkylsulphonyl;
R₆ is hydrogen, alkyl, alkoxy, aryloxy, aralkoxy, CN, halogen, carboxyl or alkoxycarbonyl;
R₇ is hydrogen, alkyl, aralkyl or aryl; and
R₈ is hydrogen, alkyl or aralkyl.
6. Process of claim 4 in which D is

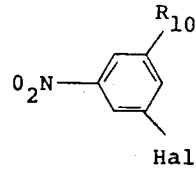

wherein
R₁₀ is nitro, nitrile, alkylsulphonyl, arylsulphonyl, halogen, alkylcarbonyl, arylcarbonyl, CF₃, dialkylaminosulphonyl, alkoxycarbonyl or dialkylaminocarbonyl;
Hal is Cl, I, or Br;
K is

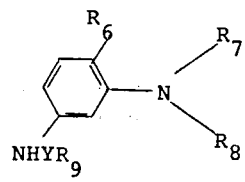

wherein
- $R_6$ is hydrogen, alkyl, alkoxy, aryloxy, aralkoxy, CN, halogen, carboxyl or alkoxycarbonyl;
- $R_7$ is hydrogen, alkyl, aralkyl or aryl; and
- $R_8$ is hydrogen, alkyl or aralkyl Y is CO or $SO_2$; and
- $R_9$ is alkyl, aralkyl, aryl, heteryl, aloxy, aralkoxy, aryloxy, amino, alkylamino, dialkylamino, cycloalkylamino or arylamino.

7. Process of claim 1 conducted at a temperature of 80°C to 100°C.

8. Process of claim 1 in which pyridines, quinolines, isoquinolines, imidazoles or indolenines are used as the nitrogen base.

9. Process of claim 1 in which pyridine is used as the nitrogen base.

10. Process of claim 1 in which mixtures of Cu-(II) salts and alkali metal cyanides, mixtures of Cu-(I) salts and alkali metal cyanides or mixtures of Cu-(II) salts, alkali metal cyanides and reducing agents which convert Cu-(II) ions into Cu-(I) ions are used as said means for forming CuCN in situ.

11. Process of claim in which CuCN is used.

12. Process of claim 1 which is conducted in the same reaction medium used for formation of said azo compound containing an ortho halogen substituent.

* * * * *